June 2, 1964 K. HINTZE ETAL 3,135,182
CAMERA WITH BUILT-IN ELECTRIC MOTOR
Filed Oct. 24, 1960
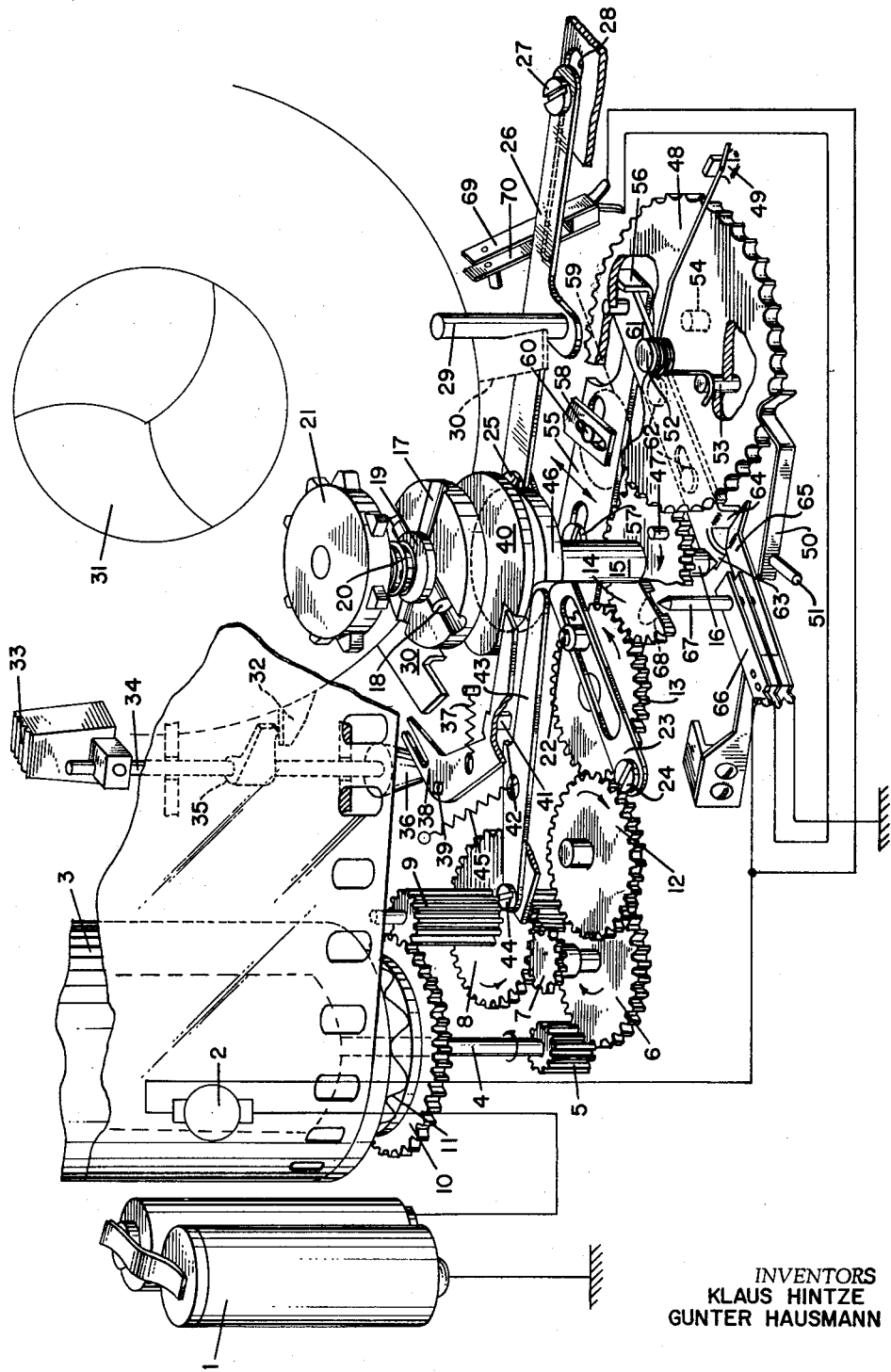
INVENTORS
KLAUS HINTZE
GUNTER HAUSMANN

United States Patent Office 3,135,182
Patented June 2, 1964

3,135,182
CAMERA WITH BUILT-IN ELECTRIC MOTOR
Klaus Hintze and Günter Hausmann, Dresden, Germany, assignors to VEB Kamera- und Kinowerke Dresden, Dresden, Germany
Filed Oct. 24, 1960, Ser. No. 64,444
6 Claims. (Cl. 95—31)

This invention relates to cameras and is particularly concerned with a photographic camera having a built in electro-motor, by means of which the setting of the shutter and the transport of the film within the camera is automatically effected.

As compared to cameras wherein the setting of the shutter and the feeding of the film is effected by means of a spring mechanism built into the camera, cameras have already become known which have the advantage that, without limitation to the number of frames on the film, a continuous operation is made feasible. Moreover, such cameras do not require the winding of the spring mechanism as none is provided. On the other hand, if an electro-motor is provided for effecting the setting of the shutter and for advancing the film, a large number of frames may be exposed which results in the danger that the maximum frame number on the film is exceeded. This, in turn, may result in serious drawbacks, e.g. the film may be torn out from its magazine so that it not only cannot be wound back but also other operational disturbances may result.

The drawbacks referred to are not prevented in known photographic cameras with built in electro-motors, wherein an alternate control is provided for the purpose of interrupting and closing the current connections for the electro-motor by means of the setting elements for the shutter and the film transport actuated by the electro-motor, or wherein the film transport is supervised and controlled by an electrical signal device. The reason for this resides primarily therein that, both, in cameras wherein the current connection from the electro-motor is alternatingly interrupted and closed, and in cameras wherein a signal device is arranged, further transport of the film in conjunction with the shutter setting is not prevented when the maximum number of frames for which the film is intended has been reached.

It is therefore an object of the present invention to provide a photographic camera with a built in electro-motor for the joint actuation of the setting of the shutter and the transport of the film within the camera which overcomes the drawback of previous constructions.

Briefly and in accordance with the invention, in addition to a contact pair which is alternately controlled by means of the shutter and the film transport elements, there is provided a counting disc which is settable in connection with the film transport. The counting disc, after having reached a predetermined set number of frames, interrupts by means of control elements at the same time through a contact pair the current connection to the electro-motor and also disengages the film transport wheel from the common drive for the shutter setting and film transport.

According to a preferred embodiment of this invention, a setting device is associated with the counting disc which setting device serves the purpose to set the desired number of frames to be exposed. By means of this setting device, a setting slide may optionally be set to any desired number of frames, the setting slide controlling the interruption of the current connection and the disengagement of the film transport wheel. A spring is furthermore associated with the counting disc which arrests the stepwise movement of the latter. The spring upon closing of the camera rear wall is urged against the latter. Moreover, the counting disc stands under the influence of a torsion spring by means of which the counting disc during opening of the camera rear wall is moved back to zero position.

Other objects and advantages of the invention will become apparent from the following detailed description and the accompanying drawing which shows a preferred embodiment of the invention in somewhat diagrammatical perspective elevation.

Referring now to the sole figure of the drawing, the principle of the inventive arrangement accommodated within the casing of a photographic camera is shown in partly perspective elevation in conjunction with a switching circuit for the electrical control. In order not unnecessarily to crowd the drawing, only those parts have been illustrated which are necessary for the proper understanding of this invention.

According to the drawing, batteries 1 are provided which serve as current source for an electro-motor 2 driving a film winding spool 3. The electro-motor 2 drives a shaft 4 which passes through the film winding spool 3. The shaft 4 in turn drives a joint drive mechanism including gear wheel 10 through a pinion 5 mounted on the shaft 4 and a gear train 6, 7, 8, and 9. The gear wheel 10 is operatively connected in known manner with the film winding spool 3 through a friction member 11. Gear 9 passes through gear 8 and drives through gears 12, 13 a driving gear wheel 14.

The film transport mechanism includes a gear wheel 14 which drives through a main-shaft stub 15 a coupling which is releasable in axial direction by means of a release pin 16, forming part of the coupling which also comprises elements 17, 18, 19 and 20. The release pin 16 is guided in the hollow axle stub 15 and moves upon actuation coupling pin 18 against the action of spring 20 out of engagement from the correspondingly formed grooves of coupling disc 17. Element 19 is a disc which rests upon the coupling disc 17 and forms a support for the spring 20, so that the latter is prevented from getting caught in the radial grooves of disc 17, provided for pin 18. The movement of the latter results in the uncoupling of a film transport wheel 21 from the driving wheel 14 and, thus, from the setting gear train which is associated with the film winding spool 3. This uncoupling enables at the same time the rewinding of the film, which in the drawing has been shown in dotted lines.

Gear 13 is provided with a crank pin 22 into which engages a lever 23 by means of a slot. The lever 23 is movably supported about a stationary screw or bolt 24. By means of an articulated screw 25, a push rod 26 is connected with the lever 23, which push rod, by means of a screw 27, is movable in a stationary guide seat 28. A pin 29 is secured on the push rod 26, which pin during the setting movement strikes against a flanged flap 30 the shutter mechanism. The flap is connected with the setting ring (not shown) of an objective shutter 31. In this manner the shutter is tensioned or set.

The release of the shutter 31 is accomplished through a release lever 32 which is actuated by the release mechanism on the face of the camera. This mechanism comprises essentially a release button 33 with a release rod 34 to which a sensing element 35 and a pressure cone 36 are connected. The pressure cone is connected to the bottom end of the rod 34. The pressure cone 36 upon actuation acts against a first blocking lever 38 which is under the action of a spring 37. The blocking lever 38 is movably mounted about a stationary bolt 39 and cooperates with a blocking disc 40 which is secured to the shaft 15 of the film transport wheel 21 and which has a blocking groove.

The blocking lever 38 has a tongue or flap 41 which is bent towards the bottom and which cooperates with a nose element 42 of a second blocking lever 43. The blocking lever 43 is movably mounted about a stationary screw 44 and is pressed against a setting cam 46 by means of a spring 45. The cam 46 is rigidly connected with the shaft 15 of the film transport wheel 21. Upon release by actuating the release button 33, the blocking lever 38 is moved by the cone 36 out of the groove of the blocking disc 40 and is held in this position by the nose element 42 of the blocking lever 43. The blocking lever 43, in turn, during setting of the shutter and during the film transport, is caused to release the blocking lever 38 in its starting position. This is accomplished by the provision of the setting cam 46 connected with the film transport wheel 21.

On the driving wheel 14 of the film transport wheel 21 there is provided a setting pin 47 which engages in the teeth of a frame counting disc 48. The counting disc 48 is rockably mounted about a stationary bolt 49. The transmission ratio is chosen in such a manner that the film transport wheel 21 performs a complete revolution upon advance of one full frame length and that the setting pin 47, advances the counting disc 48 by one tooth. The counting disc 48 is arrested by means of a spring 50 which engages into the teeth of the disc 48. The spring 50 is rigidly connected to the casing of the camera and has a pin 51. The rear wall of the camera, which has not been shown in the drawing, abuts against this pin 51.

When the camera rear wall is closed, it presses, through the pin 51, the spring 50 against the teeth of the counting disc 48, and upon opening of the wall it releases the spring 50 from its compressed position. A torsion spring 52 is associated with the counting disc 48, which spring 52 during opening of the camera rear wall, after the spring 50 has released the counting disc 48, returns the counting disc into its starting or zero position. The counting disc 48 controls, after a predetermined frame number, e.g. 20 or 36 has been reached, automatically both the interruption of the current connection for the electromotor 2 and also the uncoupling of the film transport wheel 21 from the setting gear train actuated by the electro-motor 2. In order to accomplish this result the following elements and arrangement are provided:

Below the counting disc 48, two setting pins 53 and 54 are secured which are offset both with regard to their angular position and their radial distance. The two pins 53 and 54 cooperate with a setting slide 55 forming part of a setting mechanism which has a bent over or angular end portion 56. The setting slide 55 is guided, on the one hand, by means of a guide slot in a stationary screw 57 and, on the other hand, in a crank pin 58 of an eccentric setting disc 59. The eccentric disc 59 is adjustable from outside the camera casing proper by means of a setting member (not shown). The crank pin 58 actuates at the same time a further setting element or slide 60 which is provided with setting numbers or markings visible from the outside, i.e., for example, the numbers 20 and 36 as is customary on miniature film.

By means of the eccentric disc 59 the setting slide 55, which is guided by the crank pin 58, is settable in such a manner that its bent or angular end 56 in one setting position projects into the running down region or path of the pin 53, which latter is secured on the counting disc 48, while in its other setting position it projects into the running down region or path of the pin 54. These two pins 53 and 54 may, for example, be arranged on the counting disc 48 in such a manner that the pin 53 after the exposure of 20 frames and the pin 54 after exposure of 36 frames strike the bent over end 56 of the setting slide 55 and thus impart to the same a setting movement.

The setting slide 55 acts in this movement with the bent over end 56 on a contact slide 61 which by means of its guide slot is movable in two stationary screws 62. This contact slide 61 is part of a control mechanism and has, on one side of its end facing the film transport shaft 15, an oblique portion 63 which upon movement of the contact slide 61 lifts the release pin 16 and thereby effects the uncoupling of the film transport wheel 21 from the setting gear train for the shutter and the film transport.

Moreover, the contact slide 61 has on the other side of its afore-mentioned end a bent or angular portion 64 which during movement of the contact slide 61 lifts an electric contact 65 from a counter contact 66, thereby interrupting the current connection for the electro-motor 2. A control pin 67 is secured to the counter contact 66, which cooperates with a kidney-shaped, recessed portion 68 provided in the drive wheel 14 of the film transport wheel 21. This kidney-shaped recess 68 causes the interruption and the closing of the counter contact 66 to the contact 65. Additional electrical contacts 69 and 70 are provided which are actuated by the running down shutter by means of the flap 30 arranged on the setting ring of the shutter.

The manner of operation of the embodiment of the invention described is as follows:

Let us assume that the shutter has been set, that the film has been advanced by the electro-motor, that the rear wall of the camera is closed and that the counting mechanism has been set, for example, to an exposure with 36 frames. In this position of preparedness the several elements shown in the drawing assume the position shown therein in which at the same time the current connection to the electro-motor is interrupted.

Upon effecting an exposure, which is initiated by actuating the release button 33, the pressure cone 36, which is secured to the release rod 34, moves the blocking lever 38 bearing thereagainst from the groove of the blocking disc 40. The blocking lever 38 is held in this position by means of its tongue 41 by the nose 42 of the blocking lever 43, so that the blocking lever 38 at first cannot return into the groove of the blocking disc 40.

This, in turn, results in a condition in which the gear train for setting the shutter and the film transport is released. Further, during this release movement, the sensing element 35, which is connected with the release rod 34, actuates the release lever 32 of the objective shutter 31 and thus initiates the run down of the shutter for the purpose of effecting the exposure. The sequence of these release movements is chosen and adjusted in such a manner that first the blocking lever 38 releases the blocking disc 40 for the setting gear train, whereupon the sensing element 35 initiates and releases the run down of the shutter 31.

The shutter, at the end of the run down, strikes by means of the flap 30 provided on the shutter setting ring against the open contacts 69, 70 and thereby closes the previously interrupted current connection for the electro-motor 2, so that the electro-motor is now put into action.

The electro-motor 2 thus causes the driving of the film winding spool 3, which is accomplished through the shaft 4 passing through the film winding spool 3, the gears 5, 6, 7, 8, 9 and 10 and the friction member 11. Moreover, the shutter is set at the same time by means of the simultaneously driven gear wheels 12, 13 and 14, and in particular by the wheel 13 through its crank pin 22 and the lever 23 moved thereby, and the push rod 26 whose pin 29 engages the flap 30, shown in dotted line, of the tensioning ring.

At the same time, the drive wheel 14, which is connected with the gear 13, drives the film transport wheel 21 through the coupling 17, 18 and thereby the framewise transport of the film shown in dotted lines, in connection with the likewise driven film winding spool 3 is effected. The transmission ratio is chosen such that during a complete revolution of the film transport wheel 21, one frame of the film is advanced.

During this setting movement, the cam 46, which is connected with the shaft 15 of the film transport wheel 21, moves the blocking lever 43 in such a manner that it releases the blocking lever 38 held thereby. The blocking lever 38 returns thereupon, urged by the action of the spring 37, against the blocking disc 40 and falls into position in the groove after rotation of the latter. Shortly after the beginning of the setting movement, the flap 30, which is provided on the separate setting ring, leaves the contacts 70, 69 and thus interrupts the current connection.

On the other hand, the drive wheel 14, which is in movement and which is coupled with the film transport wheel 21, presses the contact 69, which projects into the kidney-shaped recess portion 68, with the counter contact 66 secured thereto against the contact 65 so that the current connection which has been interrupted by the contacts 69, 70 is restored again. Upon rotation of the drive wheel 14, its setting pin 47 engages in one of the teeth of the counting disc 48 and thus advances the counting disc by one counting step, i.e., one tooth, the spring 50 arresting the counting disc 48 each time.

The switching or setting slide 55, 56, has been set for an exposure of, say, 36 frames through the eccentric disc 59, this number of frames being viewable from the outside by means of the setting slide 60 which is also moved by the crank pin 58. The setting slide 60 carries on the outside, for example, the numbers 20 and 36. When the frame number 36 has been obtained, the setting pin 53, which is connected to the counting disc 48 and which has been set for this number, engages the bent end 56 of the setting slide 55 and moves the latter towards the left. During this movement, the bent end 56 displaces the contact slide 61 bearing thereagainst in such a manner in the direction of the shaft 15 of the film transport wheel 21 that the oblique portion 63 which is provided on the contact element 61 lifts the release pin 16 which is moved within the shaft 15, and thereby decouples the film transport wheel 21 from the setting gear train. At the same time, the contact slide 61 strikes with its lower bent portion 64 the oblique contact 65 and presses the same away from the counter contact 66, so that the current connection to the electro-motor 2 is interrupted and the electro-motor is thus switched off.

The invention thus accomplishes that upon attainment of a predetermined set frame number both the film transport 21 is automatically disengaged from the setting gears and at the same time the electro-motor 2 is disconnected. The mode of operation of the inventive arrangement is the same even if the setting slide 60 instead of 36 exposures is set to 20 exposures by means of the eccentric disc 59. Of course, any other larger or smaller number of desired exposures may be set.

If instead of 36 exposures the setting slide 60 by the disc 59 is set for a smaller number of exposures, let us say 20, then the setting slide 60, by means of the eccentric disc 59, is displaced relative to the counting disc 48, so that the setting pin 54 of the disc 48, which is set for a frame number of 20, engages the bent end 56 of the setting slide 55 which, as already explained, decouples the film transport and interrupts the current connection to the electro-motor 2. It is obvious that the inventive setting arrangement is not limited to frame numbers of 36 and 20 exposures but may of course be directed to any other desired or suitable number.

Upon opening of the rear wall of the camera, the bolt and spring 49, 50 which is actuated thereby, is released from the counting disc 48 so that the counting disc through the action of its torsion spring 52 automatically jumps back into zero position. This holds true for all embodiments.

While a specific embodiment of the invention has been shown and described in detail to illustrate the application of the invention principles, it will be understood that the invention may be embodied otherwise without departing from such principles.

We claim:

1. A photographic camera having a housing, an objective shutter mechanism, a film-transport mechanism in said housing, a film-winding spool in said film-transport mechanism, a release member in said housing for actuating said shutter mechanism, a built-in electro-motor and a joint drive driven by said electro-motor for cocking said shutter mechanism and operating said film-transport mechanism, comprising, in combination, an axially extending main shaft forming part of said film-transport mechanism and in positive engagement with said joint drive, a driving gear secured to said main shaft, said joint drive being in positive engagement, on the one hand, with said film-winding spool and, on the other hand, with said main shaft, a film-transport wheel on said main shaft, a blocking disc coupled thereto, and coupling means in said film-transport mechanism, the latter serving for releasably interconnecting said joint drive with said film-transport wheel, a friction member interposed between said joint drive and said film-winding spool for direct engagement with the latter, for providing uniform film tension between said film-winding spool and said film-transport wheel, releasing means operatively connected to said release member for releasing said shutter mechanism and alternately interconnecting and decoupling said film-transport mechanism, a setting cam on said main shaft, a first and a second pivotally mounted blocking lever, said first blocking lever being spring-biased against and positively engaged by said releasing means, said second blocking lever being urged against said setting cam, said first blocking lever coacting with said second blocking lever and with said blocking disc, a frame counting disc rockably mounted in said housing for interrupting in a predetermined position the current path for said electro-motor when a particular member of exposed frames has been reached, a setting pin on said driving gear adapted operatively to engage said counting disc, setting means co-operating with said counting disc and selectively settable to at least two indexing positions corresponding each to another predetermined frame number, control means co-operating with said setting means, including a pair of contacts operated by said film-transport mechanism for energizing said electro-motor in the rest position of said control means, said driving gear controlling said pair of contacts for said energization of the electro-motor, said release member being adapted operatively to engage said first blocking lever and to perform said releasing of the shutter mechanism and said alternate interconnecting and decoupling of the film-transport mechanism.

2. A camera according to claim 1, wherein said pair of contacts includes a contact member and a control pin secured thereto, the closing of said pair of contacts being performed by said driving gear by actuating said control pin, while the opening of said pair of contacts is accomplished when said control pin reaches a recessed portion of said driving gear.

3. A camera according to claim 2, wherein said counting disc includes at least two setting pins protruding therefrom and corresponding each to a different one of said predetermined frame numbers, and wherein said control means further includes a setting slide adapted to engage one of said setting pins, and a reciprocable contact slide acted upon by said setting slide for said opening of the pair of contacts and the decoupling of said coupling means.

4. A camera according to claim 3, wherein said coupling means includes an axially protruding release pin, said contact slide being reciprocable with respect to said coupling means and having on one end two lateral portions, one of said lateral portions urging said release pin in the direction of said film-transport wheel for decoupling the latter, while the other of said lateral portions co-acts in said opening of the pair of contacts.

5. A camera according to claim 4, wherein said setting means has a setting disc and a crank pin secured thereto for guiding said setting slide and for selectively setting the latter into the run-down region of one of said setting pins for engagement thereby.

6. A camera according to claim 5, wherein said setting means further includes a setting element pivotable around said crank pin between two extreme positions for selectively indicating one of said predetermined frame numbers, in accordance with the prevailing position of said setting disc.

References Cited in the file of this patent
UNITED STATES PATENTS

| | | |
|---|---|---|
| 2,468,781 | Roganti | May 3, 1949 |
| 2,514,991 | Doyle et al. | July 11, 1950 |
| 2,548,172 | Pollock | Apr. 10, 1951 |
| 2,563,811 | Barnes | Aug. 14, 1951 |
| 2,697,378 | Sexton | Dec. 21, 1954 |

OTHER REFERENCES

German application 1,027,981, printed Apr. 10, 1958.